(12) United States Patent
Cathriner

(10) Patent No.: US 9,291,377 B2
(45) Date of Patent: Mar. 22, 2016

(54) AIR CONDITIONING SYSTEM WITH DISCHARGED HEAT DRIVING COMPRESSION OF SYSTEM REFRIGERANT

(76) Inventor: Richard J. Cathriner, Plano, TX (US)

(*) Notice: Subject to any disclaimer, the term of this patent is extended or adjusted under 35 U.S.C. 154(b) by 600 days.

(21) Appl. No.: 13/475,149

(22) Filed: May 18, 2012

(65) Prior Publication Data

US 2012/0291470 A1 Nov. 22, 2012

Related U.S. Application Data

(60) Provisional application No. 61/488,398, filed on May 20, 2011.

(51) Int. Cl.
 F25B 49/00 (2006.01)
 F25B 27/00 (2006.01)
 F25B 1/00 (2006.01)
 F25B 27/02 (2006.01)
 F25B 9/06 (2006.01)

(52) U.S. Cl.
 CPC . *F25B 27/02* (2013.01); *F25B 9/06* (2013.01); F25B 2400/14 (2013.01)

(58) Field of Classification Search
 CPC ......... F25B 2400/14; F25B 27/02; F25B 9/06
 USPC ...................... 62/228.1, 235.1, 498
 See application file for complete search history.

(56) References Cited

U.S. PATENT DOCUMENTS

| | | | | |
|---|---|---|---|---|
| 2,952,138 A * | 9/1960 | Russell et al. | ............... | 62/238.4 |
| 3,229,610 A * | 1/1966 | Webster | ............... | 454/335 |
| 4,235,079 A * | 11/1980 | Masser | ............... | 62/87 |
| 4,287,815 A * | 9/1981 | Henderson | ............... | 454/347 |
| 4,441,902 A | 4/1984 | Jardine | | |
| 4,455,834 A * | 6/1984 | Earle | ............... | 60/659 |
| 5,461,877 A | 10/1995 | Shaw et al. | | |
| 5,816,054 A * | 10/1998 | Yoo et al. | ............... | 62/80 |
| 6,408,644 B1 | 6/2002 | Williams | | |
| 6,658,874 B1 | 12/2003 | Trent | | |
| 6,792,767 B1 | 9/2004 | Pargeter et al. | | |
| 6,843,312 B2 | 1/2005 | Burk et al. | | |
| 7,334,428 B2 * | 2/2008 | Holdsworth | ............... | 62/501 |
| 7,340,899 B1 * | 3/2008 | Rubak et al. | ............... | 60/641.8 |
| 2002/0148225 A1* | 10/2002 | Lewis | ............... | 60/670 |
| 2003/0213260 A1 | 11/2003 | Lane et al. | | |
| 2004/0020206 A1 | 2/2004 | Sullivan et al. | | |
| 2004/0074256 A1* | 4/2004 | Hiwata et al. | ............... | 62/527 |
| 2004/0200233 A1* | 10/2004 | Funakoshi et al. | ............... | 62/498 |
| 2006/0174640 A1* | 8/2006 | Caskey et al. | ............... | 62/183 |
| 2007/0220915 A1* | 9/2007 | Heyl | ............... | 62/324.1 |
| 2009/0126381 A1* | 5/2009 | Diaz | ............... | 62/238.1 |
| 2009/0249826 A1* | 10/2009 | Hugelman | ............... | 62/498 |
| 2010/0206179 A1 | 8/2010 | Foster et al. | | |
| 2010/0218528 A1 | 9/2010 | Yakumaru et al. | | |
| 2010/0252644 A1 | 10/2010 | Elliott | | |

FOREIGN PATENT DOCUMENTS

JP 2008-157483 7/2008

* cited by examiner

*Primary Examiner* — M. Alexandra Elve
*Assistant Examiner* — Henry Crenshaw
(74) *Attorney, Agent, or Firm* — Anderson & Levine, L.L.P.

(57) ABSTRACT

An air conditioning system. The system includes apparatus for circulating a refrigerant in a path, further having apparatus for compressing the refrigerant and generating heat in the refrigerant. The system further includes apparatus for providing a driving force to the apparatus for compressing in response to the generated heat.

18 Claims, 5 Drawing Sheets

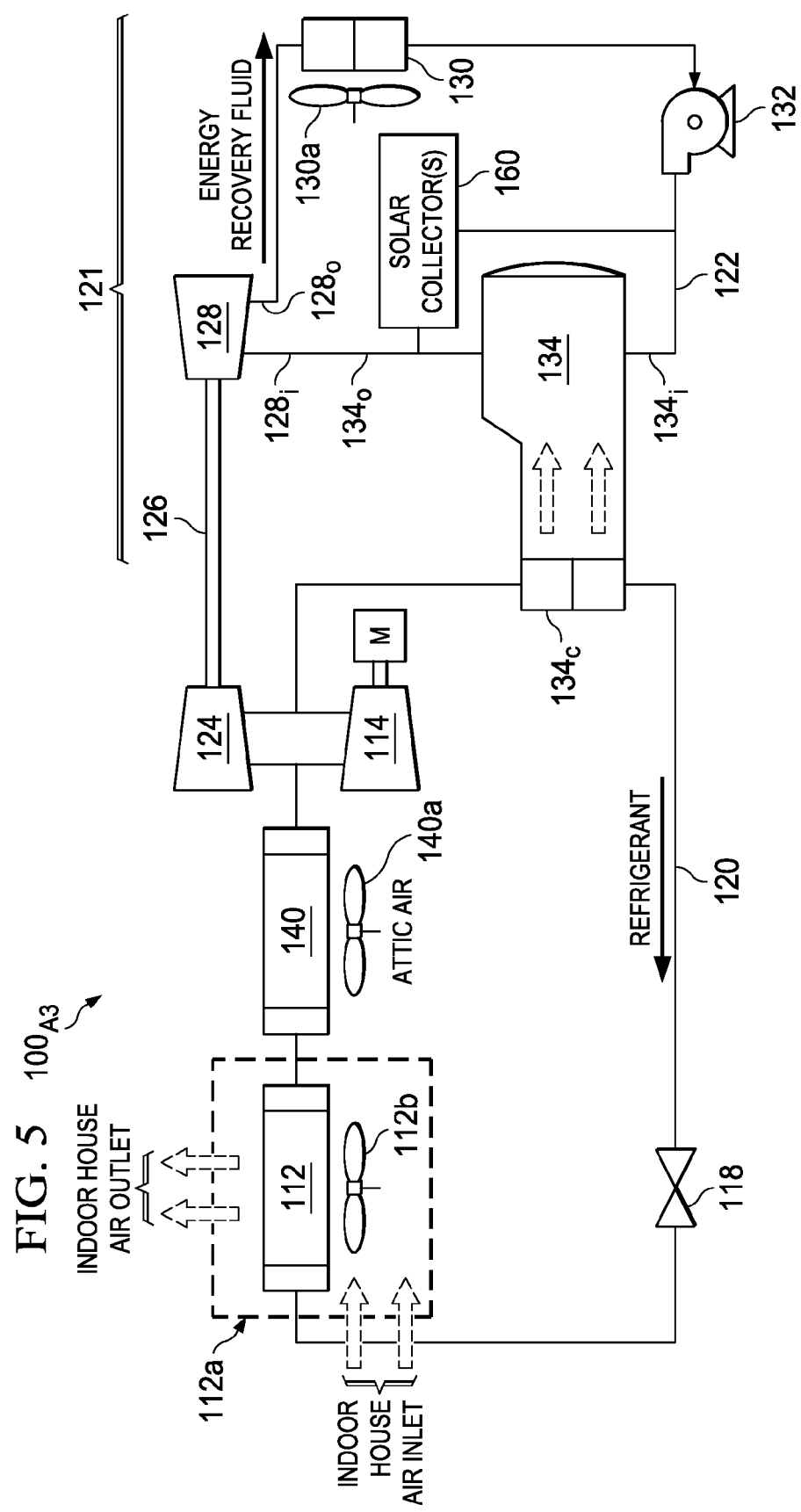

AIR CONDITIONING SYSTEM WITH DISCHARGED HEAT DRIVING COMPRESSION OF SYSTEM REFRIGERANT

CROSS-REFERENCES TO RELATED APPLICATIONS

This application claims priority, and the benefit of the filing date, under 35 U.S.C. §119 of U.S. Provisional Application No. 61/488,398, filed May 20, 2011, and which is hereby incorporated herein by reference.

STATEMENT REGARDING FEDERALLY SPONSORED RESEARCH OR DEVELOPMENT

Not Applicable.

BACKGROUND OF THE INVENTION

The present embodiments relate to air conditioning systems and are more particularly directed to such systems that use heat energy transferred from a system to drive all, or part, of the refrigeration compression requirements.

By way of background, a type of conventional prior art air conditioning system is shown in FIG. 1 and generally at 10. System 10 typically include four primary elements, namely, an evaporator 12 (sometimes part of an air exchanger 12a), a compressor 14, a condenser 16, and a metering device 18. A line 20 is in fluid communication between these elements and carries a refrigerant, where the refrigerant changes phase based on its location along the line and the conditions at that location. Typically, the various elements of system 10 are in different physical locations relative to the building (or vehicle) to which they are providing cooling. For example, air exchanger 12a (and its evaporator) is usually located in a building space that is not typically accessed by occupants, such as in the attic of a house. As another example, compressor 14 and condenser 16 are typically outside of the building, for purposes of noise reduction and also so as to dispel heat from the system, as further described below.

The operation of system 10 in general as follows. Refrigerant flows through line 20, and for sake of example consider the direction of flow as clockwise as shown by an arrow in FIG. 1. For example, refrigerant in a relatively cool and liquid phase enters evaporator 12; at the same time, indoor air is inlet, in response to a circulation created by a fan 12b, into heat exchanger 12a so that the air passes over or by line 20 as that line communicates refrigerant through evaporator 12. In this manner, heat from the relatively warmer inlet air is transferred into the refrigerant (i.e., removed from the inlet air), so the outlet air is cooler than the inlet air—the relatively cooler outlet air may then be distributed to the home or other building by ducts or the like (not shown) to cool, so as to improve comfort in that building with which system 10 is associated. Note also that the addition of heat to the refrigerant via evaporator 12 causes the refrigerant to experience a phase change from a liquid to a vapor.

The vapor from evaporator 12 continues along line 20 to an inlet of compressor 14. Compressor 14, driven by a motor M that is typically electrically-sourced, compresses the vapor, thereby increasing both its pressure and temperature. A typical compressor may include some type of cylinder chamber to compress the vapor in this regard, where the motor M drives a mechanism, such as a shaft, to cause a piston within the cylinder to reciprocate and thereby compress the vapor. In any event, the compressed, higher temperature, higher pressure vapor is then output from an outlet of compressor 14.

The compressed, higher temperature, higher pressure vapor from compressor 14 is received from line 20 at an inlet 16, of condenser 16, which typically also has an associated fan 16a. Fan 16a circulates air across condenser 16, and that air along with the typical structure or coiling of the condenser removes heat from the vapor and thus causes it to condense, thereby causing the vapor that was inlet to experience a phase change to liquid, at a relatively high pressure. Note also therefore that warm air is discharged from the area of condenser 16 in response to fan 16a and the condensing effect of the vapor in line 20. As noted above, typically condenser 16 is located outside, so that this warm air discharge is away from the home and does not further burden or otherwise affect the home, system 10, or the home occupants. In any event, the high pressure liquid is then output from an outlet $16_o$ of condenser 16.

The high pressure liquid from outlet $16_o$ of condenser 16 continues along line 20 to an inlet of metering device 18, which typically includes some type of appropriately sized valve and or tube and is sometimes referred to as a backpressure or refrigeration valve. Metering device 18 thereby reduces the pressure of the liquid refrigerant, and as a result also reduces its temperature, while further limiting the flow rate into evaporator 12. Thus, the output of metering device 18 toward evaporator 12 is a relatively lower temperature, lower pressure liquid refrigerant that then enters evaporator 12, whereby the above process repeats so that such liquid refrigerant may carry heat away from the air introduced by inlet to air exchanger 12a.

The above approach of system 10 has been prolific in homes and other structures for many decades and has proven quite beneficial to mankind, particularly in warmer environments. Various improvements have been made to the elements of system 10, with various goals in making such improvements. One very important aspect of system 10 has been and is the amount of energy used to drive the system. As society has advanced, energy consumption and use have been offered to have more and more significance not only to people, but also to the entire planet. Thus, there is a growing if not imperative need to improve efficiencies of system 10 or comparable air conditioning systems, and the preferred embodiments are directed to this endeavor, as further discussed below.

BRIEF SUMMARY OF THE INVENTION

In a preferred embodiment, there is an air conditioning system. The system comprises apparatus for circulating a refrigerant in a path, and this apparatus comprises apparatus for compressing the refrigerant and generating heat in the refrigerant. The system further comprises apparatus for providing a driving force to the apparatus for compressing in response to the generated heat.

Other embodiments and aspects are also disclosed and claimed.

BRIEF DESCRIPTION OF THE SEVERAL VIEWS OF THE DRAWING

FIG. 5 illustrates a third alternative preferred embodiment air conditioning system.

DETAILED DESCRIPTION OF THE INVENTION

Figure 1:
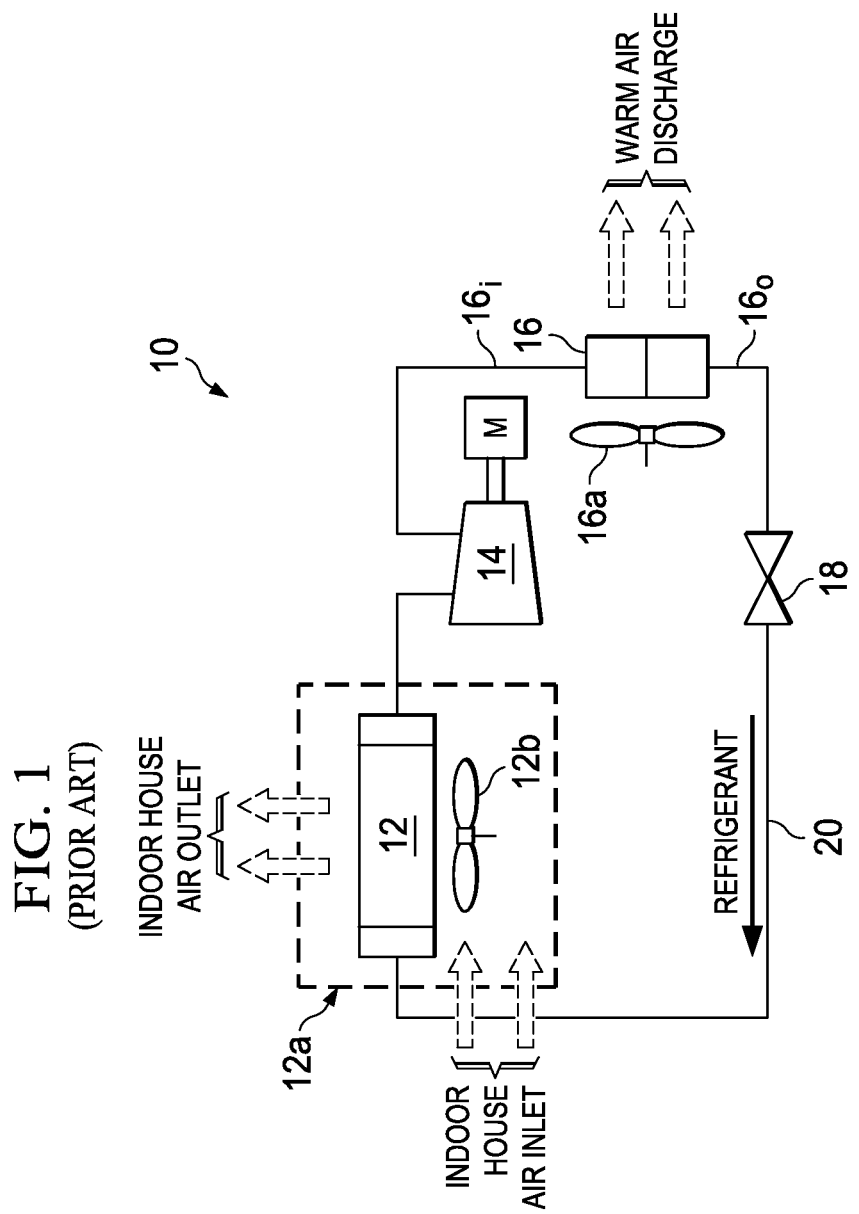
FIG. 1 illustrates a simplified general diagram of a prior art air conditioning system.

FIG. 1 was described in the earlier Background Of The Invention section of this document and the reader is assumed to be familiar with the details presented in that description.

Figure 2:
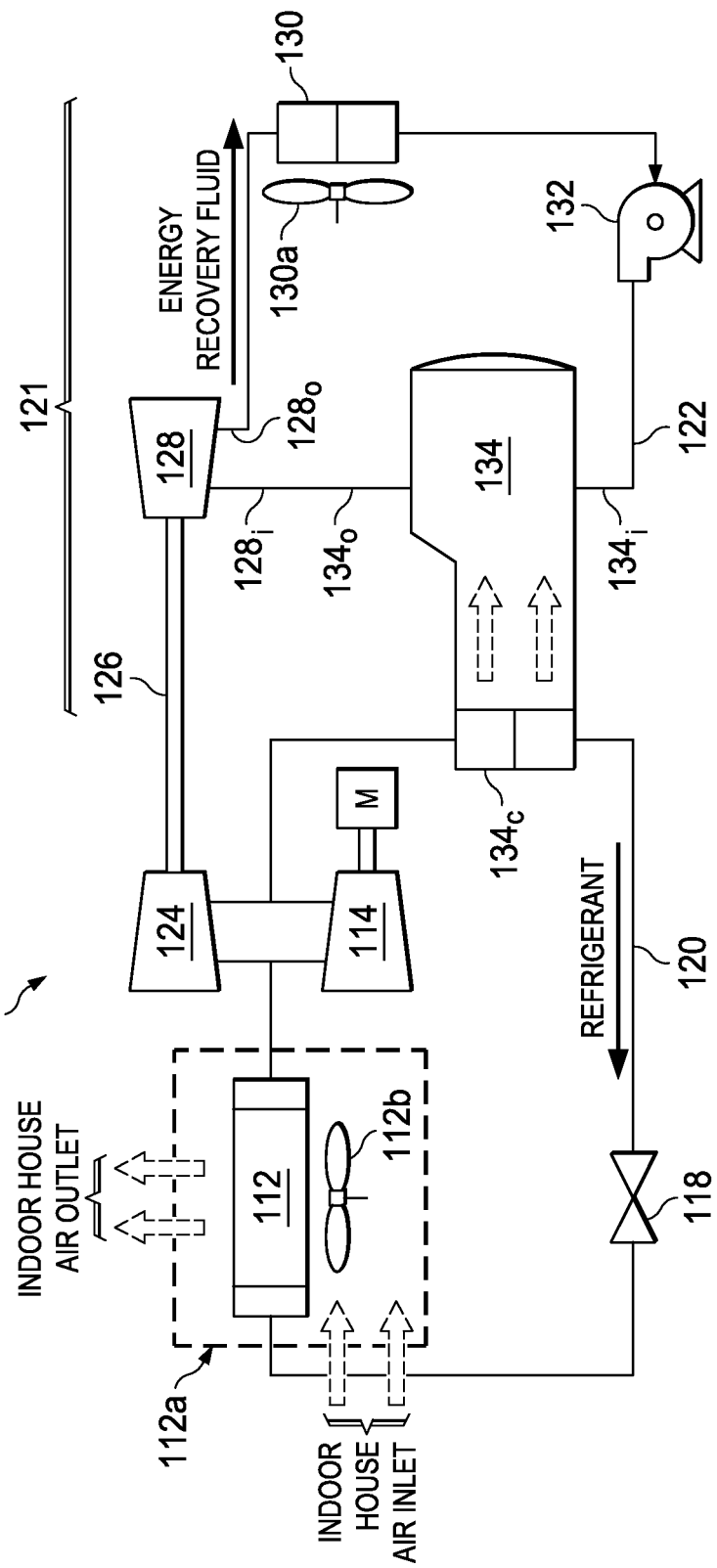
FIG. 2 illustrates a preferred embodiment air conditioning system.

FIG. 2 illustrates an air conditioning system 100 according to a preferred embodiment. System 100 includes various apparatus that are comparable to system 10 discussed above in connection with FIG. 1, and for sake of assisting the reader those apparatus use a same reference number as in FIG. 1, but with the number 100 added thereto. Thus, in general the reader familiar with FIG. 1 should readily appreciate, in FIG. 2, evaporator 112, compressor 114 driven by a motor M, metering device 118, and the flow of refrigerant in line 120. A refrigerant, which in one preferred embodiment may be propane, or in other embodiments may be selected by one skilled in the art, is circulated through these apparatus which are all in fluid communication with one another via line 120. Additionally, these apparatus may be modified further so as to facilitate improved or ideal operation with the remaining apparatus of system 100, as further described below. Note also that the apparatus of system 100 are intended as a general example of any air conditioning system that implements a refrigerant to cool air; as such, system 100 also may be the components in a so-called heat pump, when those components are operated to move refrigerant in a manner so as to remove heat from air inside a structure. Thus, the present inventive scope is intended to include such other refrigerant systems as a type of air conditioning system. Lastly, note that preferred air conditioning systems of the present inventive scope may be in various different structures, including buildings and homes, but also as may be implemented or modified into others as well (e.g., vehicles).

System 100 of FIG. 2 further includes a sub-system 121, which as further appreciated herein uses heat, preferably generated from the operation of other apparatus in system 100, to generate a mechanical force to provide or supplement compression of the refrigerant in line 120. In this regard, sub-system 121 circulates what is referred to herein as an energy recovery fluid through a line 122 and in response to that fluid provides a mechanical force to a second compressor 124, which in the illustrated embodiment is shown in parallel with compressor 114. This parallel configuration is intended to illustrate, and as further demonstrated later, that either or both of compressors 114 and 124 are in fluid communication with line 120, and therefore either or both of those compressors 114 and 124 may draw in the refrigerant from that line, compress it, and exhaust the compressed refrigerant further along line 120. Note that compressor 124 (and 114) may be one of various types of apparatus either known in the art or ascertainable by one skilled in the art and that operates to provide a compression process; for example, such compressors can include centrifugal, positive displacement, scroll type, or screw type. Also, while not shown, additional metering and/or valves or the like may be included to support this parallel connection. In any event, in that sub-system 121 generates a mechanical force to provide or supplement compression of the refrigerant in line 120, the coupling of this mechanical force is shown via a rotating shaft member 126 coupled to and for operating, or more particularly driving, the compression operation of compressor 124, where rotating shaft member 126 is driven by an expansion motor 128. Expansion motor 128 is preferably a mechanical apparatus with an inlet $128_i$ and an outlet $128_o$ that are in fluid communication with the energy recovery fluid line 122, and such that an expansion process is realized by motor 128 in that a differential pressure across it is converted into a mechanical force. Thus, motor 128 may be one of various types of apparatus either known in the art or ascertainable by one skilled in the art and that operates to provide an expansion process; for example, such apparatus can include positive displacement or turbine apparatus. In any event, motor 128 provides a mechanical force, where in the illustrated example the force is a rotating force. More particularly in the illustrated embodiment, the expansion process is in response to vapor passing in inlet $128_i$, which drives motor 128 and in response experiences a pressure drop so that a lower pressure vapor passes from outlet $128_o$. Thus, in one sense or in a physical embodiment, expansion motor 128 may include a cylinder (or more than one cylinder) with a reciprocating piston, and appropriately timed valves, such that the relatively higher pressure vapor from inlet $128_i$ drives downward the piston in one stroke and is exhausted from the cylinder to outlet $128_o$ in another stroke as the piston rises. More generally, therefore, motor 128 represents an expansion process whereby a positive displacement engine (or turbine) creates rotation, typically coupled to a shaft, in response to a pressure differential. Thus, motor 128 rotates shaft 126 which in turn also drives compressor 124 so that it may compress refrigerant in line 120, while at the same time motor 128 outputs a reduced pressure vapor to line 122 and further along sub-system 121, in a direction which in FIG. 2 is illustrated as clockwise. Lastly, note that while compressor 114 and compressor 124 are shown diagrammatically as separate apparatus in FIG. 2, one skilled in the art may implement a more unitary device whereby a single compressing structure is used, but is driven in one instance by motor M as its energy source and in other instance by a force (e.g., rotating) from sub-system 121 as its energy source, with appropriate adjustment, clutching, or other mechanisms for regulating the timing of which source is used at a given time and/or whether at times both sources may be shared at an adjustable level as between those sources.

Continuing with sub-system 121, the reduced pressure vapor from outlet $128_o$ of motor 128 is input to a condenser 130, which operates in combination with a fan 130a and in a manner comparable to the condensing function described earlier with respect to system 10. Thus, fan 130a moves air across condenser 130, and that air along with the typical structure (e.g., coiling) of the condenser removes heat from the vapor and thereby causes it to condense, thereby causing the vapor that was inlet to experience a phase change to liquid. The resulting liquid is then output from an outlet of condenser 130.

Continuing with sub-system 121, the resulting liquid output from condenser 130 is connected to an inlet of a pump 132. In a preferred embodiment, pump 132 is electrically driven, but only requires sufficient horsepower to circulate the energy recovery fluid along line 122 of sub-system 121; therefore, this horsepower will be significantly smaller than say, that horsepower required to collectively drive compressors 114 and 124. Thus, as further appreciated later, the electricity required to drive the horsepower of pump 132 is far less than it would be to provide the horsepower out of compressor 114, were the latter singularly responsible to compress the refrigerant of line 120. In any event, pump 132 advances the energy recovery fluid in its liquid phase in line 122 from the pump input to the pump output, again in the clockwise direction for the illustrated example, thereby providing an increased pressure liquid in sub-system 121.

Continuing with sub-system 121, the increased pressure liquid is provided to an inlet $134_i$ of a heat exchanger 134. In general, heat exchanger 134 exchanges heat from the refrigerant in line 120 to the energy recovery fluid in line 122. Toward this end, a condensing portion $134_C$ of heat exchanger 134 is in fluid communication with line 120 (as shown to the left of that device), and that portion provides, in part, a condensing function in that it removes heat from refrigerant in line 120 as it passes through heat exchanger 134. In addition, heat exchanger 134 is in fluid communication with line 122 (as shown to the right of that device), and that portion provides, in part, a boiler function in that it receives heat from refrigerant in line 120 as it passes through heat exchanger 134 and couples that heat to the energy recovery fluid in line 122. Therefore, shown to the left in FIG. 2 with respect to heat exchanger 134 is a condensing function consistent with prior art air conditioning, but to the right in FIG. 2 with respect to heat exchanger 134 is a heat collection or boiler function, in that there is a transfer of heat as a result of higher temperature fluids (i.e., the left in FIG. 2) with lower temperature fluids (i.e., the right in FIG. 2) so that heat is added to energy recovery fluid in line 122. Notably, therefore, where the prior art exhausts the heat from its condensing function (see, e.g., condenser 16 in FIG. 1), typically outside and in a manner to treat such heat as undesirable, the preferred embodiment recognizes this low grade heat source and uses it beneficially as further detailed herein. In this regard, recalling that inlet $134_i$ of exchanger 134 receives a relatively higher pressure liquid, then the addition of heat thereto, from heat exchanger 134, causes the energy recovery fluid to experience a phase change from a liquid to a vapor, while also having higher heat than the liquid received at inlet $134_i$. This higher temperature vapor is then output from exchanger 134 via outlet $134_o$.

Completing the energy recovery fluid loop path of subsystem 121, outlet $134_o$ communicates its higher temperature vapor to inlet $128_i$ of motor 128. Recall from above that motor 128 operates in response to the pressure of such vapor to achieve an expansion process event, that is, the pressurized inlet vapor is used to drive an apparatus (e.g., piston(s), turbine(s)) so as to provide a resulting force (e.g., rotating force), thereby producing that force as a mechanical output while outletting the inlet vapor at a reduced pressure as compared to the inlet vapor. Again, in the preferred embodiment of FIG. 2, the mechanical output force is used to drive shaft 126, while the outlet reduced pressure vapor continues along line 122 and is further cycled as described above.

From the above, one skilled in the art may now recognize that system 100 includes two separate fluid paths, a first path shown generally along line 120 and a second path along line 122. The first path removes heat from air so as to provide a cooling effect to the air, as generally consistent with a traditional air conditioning system in many respects; however, this path is augmented, in connection with the second path. More particularly, the second path collects heat from the first path, and uses that heat to supply a compression force in the first path. Remarkably, therefore, whereas the prior art operates to discard low grade heat from a system, such as typically by locating its condenser (e.g., condenser 16) outdoors, the preferred embodiment of FIG. 2 instead collects a portion, and ideally the majority, of heat dispelled from the first path and uses such heat in a novel manner to ultimately generate a mechanical compressing force for the first path. In a preferred embodiment, this latter functionality is achieved by including in the second path an energy recovery fluid that is affected by heat from the first path so as to provide an expansion process event, the event thereby driving a motor 128 which provides a mechanical operational force (e.g., rotates a shaft 126 or provides some other driving force, such as a reciprocating force) to further drive a compressor 124, the latter of which is associated with the first path. Thus, in typical operation of system 100, an energy source (e.g., electricity) first drives motor M of compressor 114 so as to compress refrigerant in line 120, but as heat develops in that line 120, the heat is transferred to line 122 and its potential energy is captured to return a driving force to compressor 124, which may therefore provide its own compression of refrigerant in line 120, thereby augmenting the compression required of compressor 114. In other words, under certain conditions, once sufficient heat is generated in system 100, compressor 124 may provide compression in line 120, thereby reducing the energy (e.g., electricity) needed during that time to drive compressor 114. Under these conditions, it is possible therefore that electricity is required to drive the relatively low horsepower requirements of pump 132, whereas the much higher horsepower requirements of compressor 124 are achieved or partially achieved by mechanical force resulting from the low grade heat source that is provided by heat exchanger 134. Under these conditions, the ability to reduce the electrical energy needed to drive compressor 114 could have a profound impact on the efficiency of energy consumption of system 100, as instead of requiring a precious energy source such as electricity, and all that is entailed in its generation, distribution, and consumption, system 100 instead uses what heretofore was exhausted low grade heat, now via exchanger 134, as an energy source that is converted into a drive force for compression in line 120. Based on adjustments that may be made to system 100, its apparatus, and the fine tuning of various parameters, the impact of these changes may prove quite profound, if not fundamentally transformative in air conditioning as well as the consumption and resulting waste involved with planetary resources.

Figure 3:
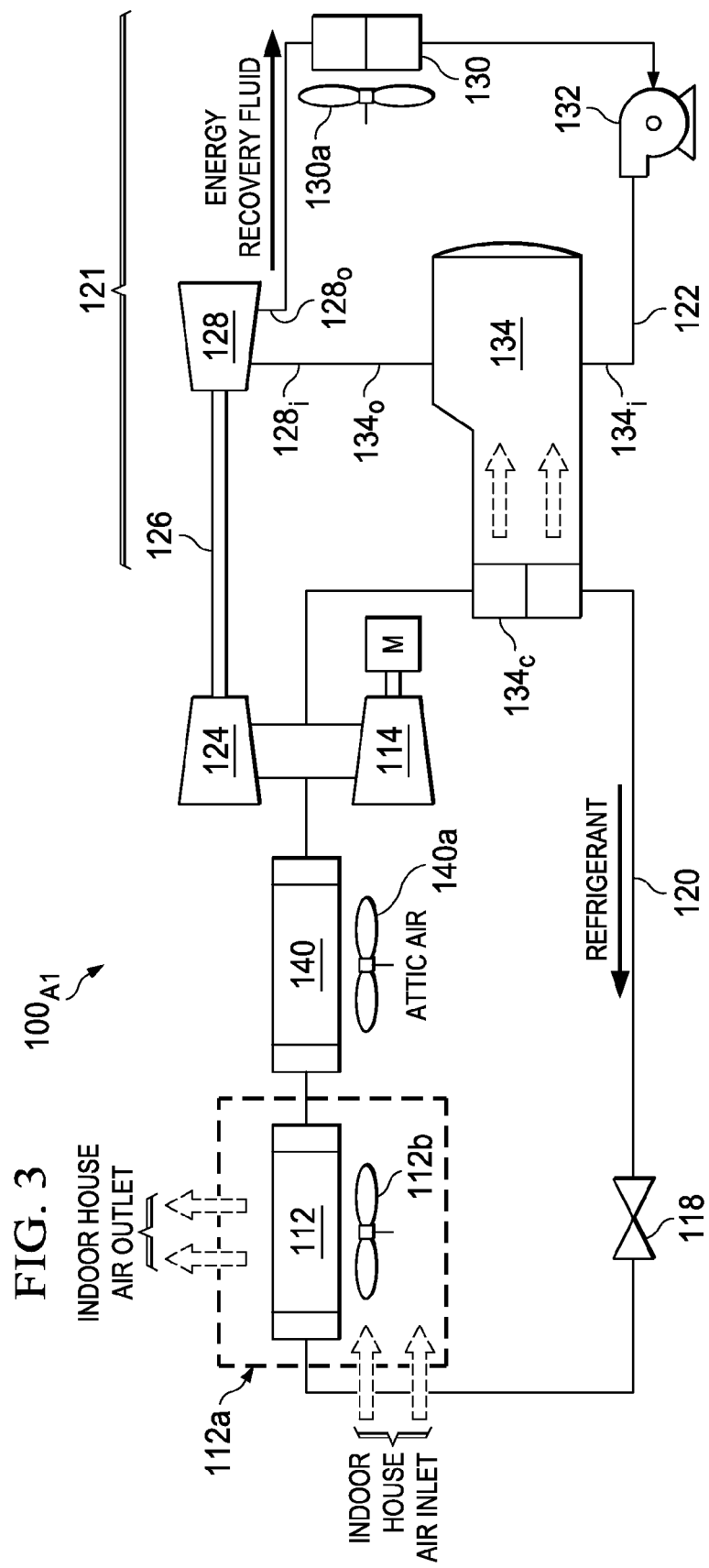
FIG. 3 illustrates a first alternative preferred embodiment air conditioning system.

FIG. 3 illustrates an air conditioning system $100_{A1}$ according to an alternative preferred embodiment. System $100_{A1}$ includes in general the same apparatus as the preferred embodiment system 100 in FIG. 2. However, some of the system $100_{A1}$ apparatus could be further modified based on temperature and pressure changes that may arise in view of the one additional apparatus in system $100_{A1}$ as compared to system 100, namely, that system $100_{A1}$ includes an additional heat exchanger 140 coupled in fluid communication with line 120, as further detailed below.

More specifically in system $100_{A1}$, heat exchanger 140 is configured to provide an additional heat source to the refrigerant in line 120, where again the refrigerant therein may be chosen by one skilled in the art and may be propane. In the preferred embodiment of system $100_{A1}$, therefore, heat exchanger 140 is physically located in an area that provides ambient heat, such as within the attic of a building that has its air cooled by system $100_{A1}$. As a result, and preferably in cooperation with a fan 140a, the ambient heat is directed toward the vapor that is communicated by line 120 through heat exchanger 140, thereby adding heat to that vapor. This addition may further improve the net results of operation of system $100_{A1}$ as compared to system 100 in that additional heat energy is added in order to significantly improve the net resulting work energy available for the compression process in line 120, as further explored below.

One skilled in the art can recognize that the additional heat added to refrigerant in line 120 by heat exchanger 140 will necessarily cause a higher temperature vapor to enter compressors 114 and 124 in system $100_{A1}$, as compared to system 100. Note that adding heat to a vapor that is to be inlet to an air conditioning compressor is contended to be quite contrary to conventional air conditioning systems that seek to have lower temperature inputs to the compressor. In any event, as a consequence of the FIG. 3 preferred embodiment, the output of either, or both, of these compressors 114 and 124 also will be higher in temperature in system $100_{A1}$, as compared to system 100. Next, therefore, the relatively higher temperature compressed vapor, in system $100_{A1}$, passes to the condenser portion of heat exchanger 134, and, therefore, the relatively larger temperature causes a greater amount of heat to transfer from the refrigerant in line 120 to the energy recovery fluid in line 122, as compared to the amount of heat transferred with system 100. As a further consequence, therefore, the vapor at outlet $134_o$ in system $100_{A1}$ will be at a higher temperature (and pressure) than in system 100, thereby providing a greater pressure potential for the differential drop to occur across expansion motor 128; in other words, by adding additional heat to line 120, that added heat in system $100_{A1}$ results in a greater pressure available to drive expansion motor 128, thereby rendering its available mechanical output energy as greater via shaft 126 to compressor 124 than in system 100. Indeed, with further advancements in certain considerations, the added pressure in line 122 might be sufficient to use that energy recovery fluid to drive, via fluid communication, an additional generator in parallel with motor 128 (not shown), whereby the energy (e.g., electricity) from the additional generator is stored in a battery or otherwise used real time either with system $100_{A1}$ (e.g., to drive pump 132) or to supply other apparatus.

An additional benefit of the use in system $100_{A1}$ of a higher temperature refrigerant in line 120 (from heat exchanger 140), and the corresponding higher temperature it causes in the vapor in and out of the energy recovery fluid in line 122 through expansion motor 128, is that a sufficient outlet temperature of expansion motor 128 is desirable to support a selection of certain types of energy recovery fluids. More specifically, in either preferred embodiment of system 100 or system $100_{A1}$, it has been determined in connection with the inventive scope that propane (not to be confused with that in line 120) may have favorable properties to serve as the energy recovery fluid, and while other refrigerants also may be usable in line 122, propane in some embodiments may be preferred considering for example its characteristics in supporting the proper phase changes (i.e., vapor pressure) in sub-system 121. In this regard, a sufficient temperature (e.g., 90° F.) may be sought at the outlet $128_o$ of expansion motor 128, and the additional heat from exchanger 140 in system $100_{A1}$ may well serve to better ensure such a temperature. Thus, with this heat, the use of propane may be better supported as the energy recovery fluid in sub-system 121, thereby making available its favorable properties to properly assure the operation described herein. In addition, propane is readily available and reasonable in cost. However, alternative fluids in line 122 are recognized within the present inventive scope, as the choice thereof will be based on the desired pressures and temperatures at different locations in line 122 as well as the energy transfer between line 120 and line 122.

Figure 4:
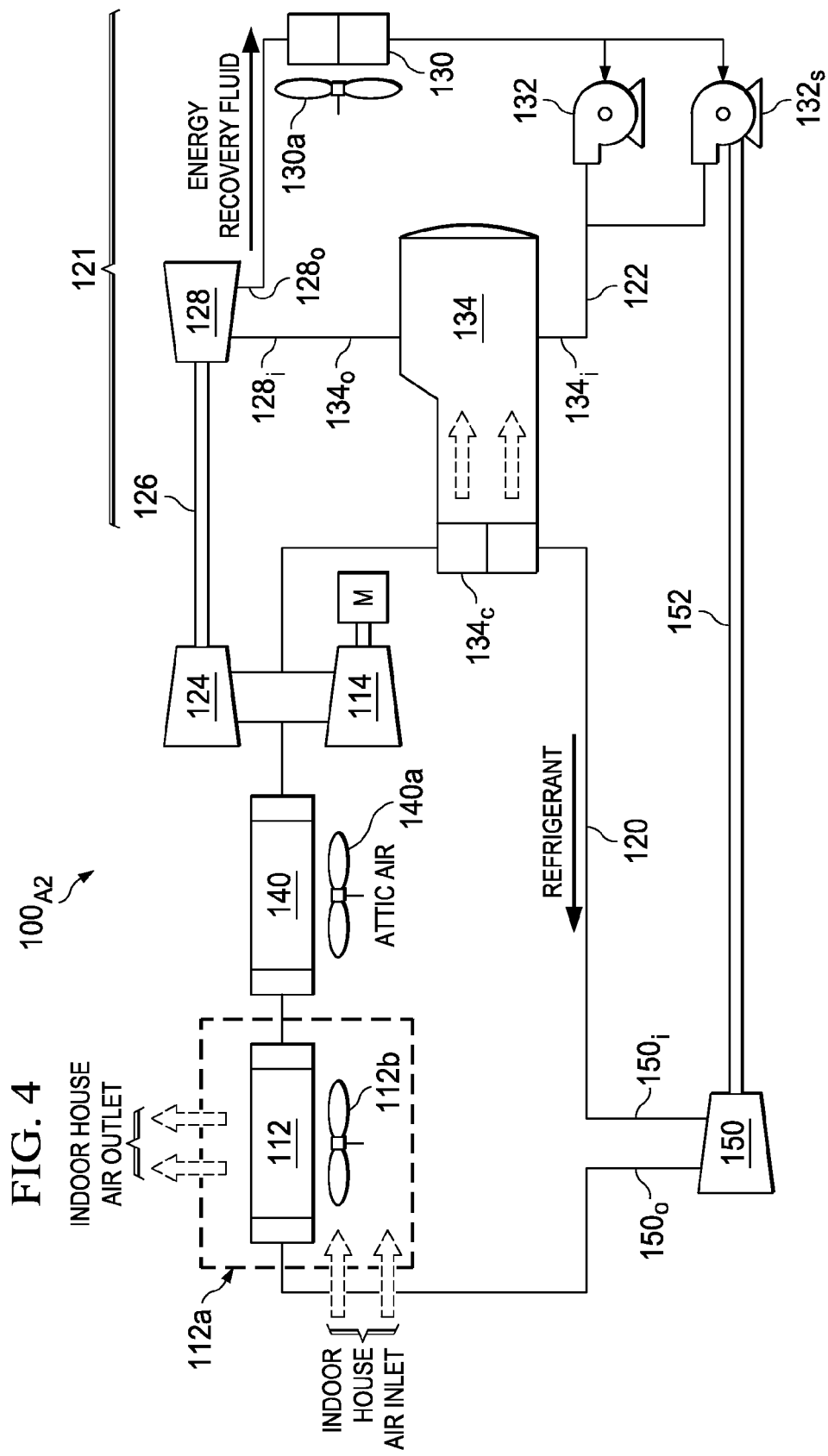
FIG. 4 illustrates a second alternative preferred embodiment air conditioning system.

FIG. 4 illustrates an air conditioning system $100_{A2}$ according to another alternative preferred embodiment. System $100_{A2}$ includes much of the same apparatus as the preferred embodiment system $100_{A1}$ in FIG. 3, and for such apparatus like reference numbers are carried forward from FIG. 3 to FIG. 4. In system $100_{A2}$, however, metering device 118 is replaced with an energy exchange device 150 that is operable to translate a pressure drop of the flow through it into a mechanical operational (e.g., rotational) force; such a device is sometimes referred to commercially as an "energy exchange pump." Energy exchange device 150 has an inlet $150_i$ and an outlet $150_o$ that are in fluid communication with line 120, such that the differential pressure across device 150 is converted into a mechanical driving force. This mechanical force is shown via a rotating shaft member 152 coupled to, and for operating, or more particularly driving, a supplemental pump $132_S$. Looking more particularly to supplemental pump $132_S$, it is located in sub-system 121 and connected in parallel to pump 132, that is, line 122 is connected to an inlet of pump $132_S$ and to an outlet of pump $132_S$ such that pump $132_S$, as a supplement to pump 132, advances the energy recovery fluid in its liquid phase in line 122 from the pump input to the pump output, again in the clockwise direction for the illustrated example, thereby providing an increased pressure liquid in sub-system 121, as also further described below.

The general operation of system $100_{A2}$ should be understood by one skilled in the art given the earlier embodiments, and thus, primarily aspects pertaining to the additional apparatus in FIG. 4 are now described. In general, as with systems 100 and $100_{A1}$, above, heat generated in line 120 is transferred to an energy recovery fluid in line 122, from which an expansion event is realized so as to provide an operational force back to a compressor 124 in communication with line 120. Looking to the changes in system $100_{A2}$ over the others, energy exchange device 150 translates the pressure differential of fluid in line 120 and across it into a force that can be used to supplement sub-system 121. More particularly, energy exchange device 150 rotates shaft 152 which in turn drives pump $132_S$, the latter of which advances the energy recover fluid in line 122. As a result, the net effect of energy exchange device has at least two benefits. First, energy exchange device 150 provides some power to drive the circulation of the energy recovery fluid in line 122. Second, the work energy extracted by energy exchange device 150 from the refrigerant in line 120 lessens the energy transferred into the refrigerant in line 120, thereby allowing a larger percentage of the refrigerant to remain liquid during the expansion process—in other words, as known in the refrigeration art, a goal is to pass to an evaporator a greater amount of liquid in the circulating mixture, and in the present embodiment the mixture of vapor and liquid as it passes through energy exchange device 150 provides a greater percent of liquid to evaporator 112, as compared to refrigerant that flows through metering device 118 in FIG. 2. Indeed, model simulations have thusly shown a measurable increase in refrigeration duty for a given size compressor. This, in turn therefore, reduces the compression power required of compressors 114 and 124, thereby further improving efficiency.

FIG. 5 illustrates an air conditioning system $100_{A3}$ according to another alternative preferred embodiment. System $100_{A3}$ includes the same apparatus as the preferred embodiment system $100_{A1}$ in FIG. 3, and with the addition of one additional aspect in the form of a solar collector 160 (or more than one solar collector) located in sub-system 121. Solar collector 160 may take various forms, with a contemporary and favorable example including vacuum tube technology. Solar collector 160 is coupled so as to provide solar-collected heat into the energy recovery fluid of line 122 and, therefore, is diagrammatically shown connected in two different locations to line 122. In a preferred embodiment, these couplings are in parallel with the inlet $134_i$ and outlet $134_o$ of heat exchanger 134, where as a result heat exchanger 134 imparts heat to the fluid in line 122, while at the same time solar collector 160 also imparts heat to the fluid in line 122. Note also that while FIG. 5 illustrates the addition of solar collector 160 to system $100_{A1}$ of FIG. 3, it likewise could be added to system 100 of FIG. 2, system $100_{A2}$ of FIG. 4, or other systems consistent with the teachings herein.

The general operation of system $100_{A3}$ also should be understood by one skilled in the art given the earlier embodiments, with again heat generated in line 120 transferred to an energy recovery fluid in line 122, an expansion event realized in sub-system 121, and an operational force provided back to a compressor 124 in communication with line 120. Looking to the addition of solar collector 160 in system 100$_{A3}$, this aspect couples solar heat into the energy recovery fluid in line 122, with it preferred that the temperature added via the solar collector 160 to the fluid in line 120 is consistent with the expansion process of expansion motor 128. As a result, the additional heat increases the drive capability realized by expansion motor 128 and provided to second compressor 124. Thus, in addition to the energy transferred from line 120 to sub-system 121, system 100$_{A3}$ includes additional apparatus for adding heat into line 122. As a result, while the energy provided from heat in line 120 is anticipated to drive a significant portion of the required air conditioning compressive load, an external source of energy in sub-system 121 (e.g., solar energy, via collector 160) may allow system 100$_{A3}$ to operate with even further reduced electrical needs (e.g., a reduction in the electricity, if any, needed to drive motor M of compressor 114). Indeed, in the example of FIG. 5, an abundantly and freely available non-electrical energy source (i.e., the sun) is used in lieu of more costly obtained energy (i.e., electricity) otherwise required to contribute to the overall operation of system 100$_{A3}$.

From the above, the preferred embodiments provide air conditioning systems and more particularly such systems that use heat energy transferred from the system to drive all, or part, of the refrigeration compression requirements. In the illustrated embodiments, a separate expansion process apparatus (e.g., motor 128) is shown coupling rotational force, via a shaft 126, to a separate compressor 124; however, also envisioned within the inventive scope is the incorporation of portions or all of this apparatus into fewer or even a singular apparatus, and indeed these apparatus also may be incorporated into a singular or unitary device along with compressor 114. In any event, the inventive scope contemplates a methodology of operation of a system that at start-up uses some energy source, such as electricity, that commences operation and flow of refrigerant in line 120, but as heat is added to that refrigerant (e.g., from ambient indoor or attic air) then such heat will be transferred to the energy recovery fluid of sub-system 121, which from that energy, and possibly with supplemental heat (e.g., solar), will begin and continue to supplement, augment, or replace the energy needed to drive compressor 114 by instead using the heat-derived force to drive compressor 124 (or compressor 114, separately, or as a unitary device). Beyond this, while the present description does not explicitly describe system startups, installation, refrigerant charging, shutdowns, process safety, instrumentation, controls, and other process elements necessary for the successful performance of the system, such considerations should be ascertainable by one skilled in the art. Moreover, while various alternatives have been provided according to preferred embodiments, still others are contemplated and yet others may be ascertained by one skilled in the art. For example, although a single stage system is described, the inventive scope extends to multistage refrigeration systems and other like variations (e.g. systems with "economizers" and the like). In any event, as described above with respect to system 100, system 100$_{A1}$, system 100$_{A2}$, and system 100$_{A3}$, and other modifications thereto by one skilled in the art, the preferred embodiments may have numerous and even profound benefits as compared to prior art systems. Given the preceding, therefore, one skilled in the art should further appreciate that while the present embodiments have been described in detail, various substitutions, modifications or alterations could be made to the descriptions set forth above without departing from the inventive scope, as is defined in part by claims below.

The invention claimed is:

1. A system for producing cooled air, wherein at least a portion of the cooled air is re-circulated, comprising:
   a first set of apparatus in fluid communication along a first line for carrying refrigerant, the first set of apparatus comprising:
   a first heat exchanging apparatus configured to transfer heat from the re-circulated air to refrigerant in the first line in order to evaporate the refrigerant and provide cooled air for occupant comfort;
   a second heat exchanging apparatus configured to transfer heat from a source, the source having a higher temperature than, and being other than, the re-circulated air, to refrigerant in the first line in order to raise the refrigerant temperature prior to compression, the second heat exchanging apparatus not being configured to provide cooling air for occupant comfort; and
   apparatus for compressing the refrigerant in the first line; and
   a second set of apparatus in fluid communication along a second line for carrying an energy recovery fluid, the second set of apparatus comprising:
   a third heat exchanging apparatus for transferring heat from the refrigerant in the first line to the energy recovery fluid in the second line; and
   expansion apparatus, operationally responsive to pressure of the energy recovery fluid in the second line, to provide an operational force to the apparatus for compressing the refrigerant in the first line.

2. The system of claim 1 wherein the second heat exchanging apparatus is for transferring heat comprising heat from a natural source.

3. The system of claim 1 wherein the second heat exchanging apparatus is for transferring heat comprising solar heat.

4. The system of claim 3 wherein the solar heat comprises heated air located in a residential structure attic.

5. The system of claim 1 wherein the second heat exchanging apparatus is for transferring heat comprising heat from a non-combustible source.

6. The system of claim 1:
   wherein the first set of apparatus further comprises condensing apparatus for causing a phase change of the refrigerant in the first line from a vapor to a liquid; and
   wherein the condensing apparatus communicates heat from the refrigerant in the first line to the third heat exchanging apparatus.

7. The system of claim 1 wherein the first heat exchanging apparatus is for causing a phase change of the refrigerant in the first line from a liquid to a vapor.

8. The system of claim 7 wherein the second heat exchanging apparatus is for transferring sufficient heat into the vapor so as to cause, via the third heat exchanging apparatus, at least a 90 degree Fahrenheit temperature of the energy recovery fluid in the second line.

9. The system of claim 1 wherein the apparatus for compressing receives the refrigerant in the first line, in a vapor phase, coming from the second heat exchanging apparatus.

10. The system of claim 1 wherein the second set of apparatus further comprises apparatus for transferring solar heat to the energy recovery fluid.

11. The system of claim 1 wherein the refrigerant comprises propane.

12. The system of claim 1 wherein the energy recovery fluid comprises propane.

13. The system of claim 1:
wherein the refrigerant comprises propane; and
wherein the energy recovery fluid comprises propane.

14. The system of claim 1 wherein the apparatus for compressing comprises compressor apparatus responsive to both electricity for compressing the refrigerant and to the operational force for compressing the refrigerant.

15. The system of claim 1 wherein the first set of apparatus is part of a heat pump system.

16. The system of claim 1:
wherein the second set of apparatus comprises a pump for circulating a fluid along a path in the second set of apparatus; and
wherein the first set of apparatus comprises an energy exchange device for providing an operational force to the pump in response to a change in pressure of refrigerant circulating in the first set of apparatus.

17. A method of operating a system for producing cooled air, wherein at least a portion of the cooled air is re-circulated, comprising:
circulating a refrigerant through a first set of apparatus in fluid communication along a first line for carrying the refrigerant, the first set of apparatus comprising:
a first heat exchanging apparatus for transferring heat from the re-circulated air to refrigerant in the first line in order to evaporate the refrigerant and provide cooled air for occupant comfort;
a second heat exchanging apparatus for transferring heat from a source in order to raise the temperature of the refrigerant before compression, the source having a higher temperature than, and being other than, the re-circulated air, to refrigerant in the first line and the second heat exchanging apparatus not being configured to provide cooling air for occupant comfort; and
apparatus for compressing the refrigerant in the first line; and
circulating an energy recovery fluid through a second set of apparatus in fluid communication along a second line for carrying the energy recovery fluid, the second set of apparatus comprising:
a third heat exchanging apparatus for transferring heat from the refrigerant in the first line to the energy recovery fluid in the second line; and
expansion apparatus, operationally responsive to pressure of the fluid in the second line, to provide an operational force to the apparatus for compressing the refrigerant in the first line.

18. The system of claim 1 wherein the second heat exchanging apparatus is coupled between the first heat exchanging apparatus and the apparatus for compressing.

* * * * *